R. Montgomery,
Truss Bridge.
No. 4172. Reissued Nov. 1, 1870.
FIG: 1.
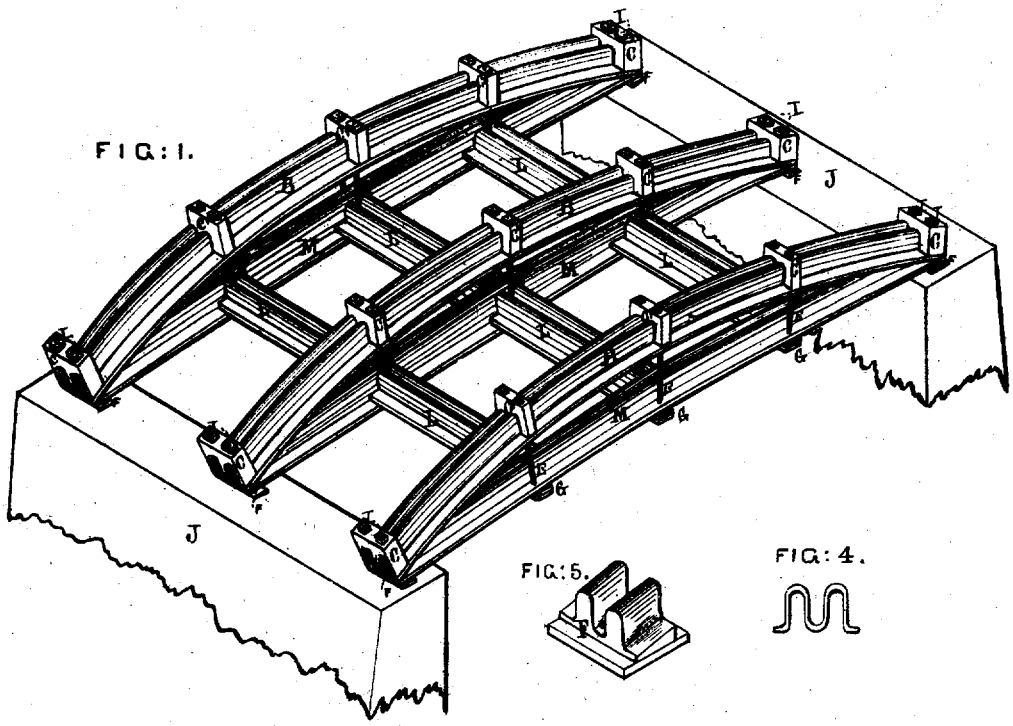
FIG: 5.
FIG: 4.
FIG: 2.
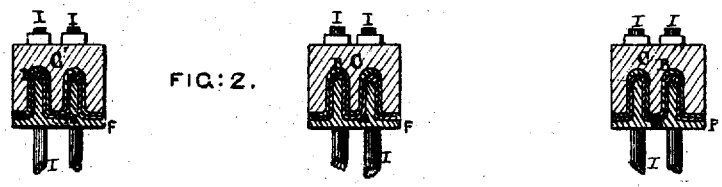
FIG: 3.
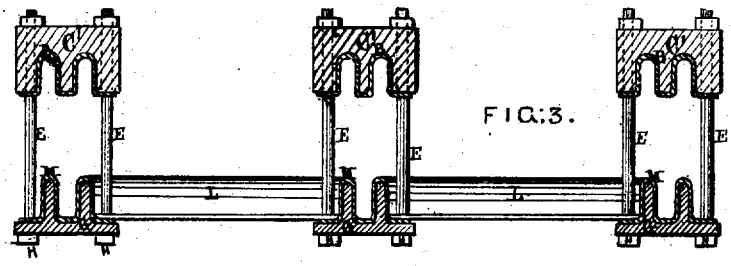
Witnesses
H. H. Young
J. Bart
Richard Montgomery
Inventor
By David Ashburn Atty
N. PETERS, PHOTO-LITHOGRAPHER, WASHINGTON, D. C.

United States Patent Office.

RICHARD MONTGOMERY, OF NEW YORK, N. Y.

Letters Patent No. 25,210, dated August 23, 1859; reissue No. 4,172, dated November 1, 1870.

IMPROVEMENT IN CORRUGATED IRON BRIDGES.

The Schedule referred to in these Letters Patent and making part of the same.

I, RICHARD MONTGOMERY, of the city, county, and State of New York, have invented new and useful Improvements in the Construction of Corrugated Iron Bridges, Roofs, &c., of which the following is a specification.

My invention relates to the combination of two or more superimposed longitudinally-corrugated or fluted metallic beams, curved upon arcs of different radii to form a double arch of a single span; and also to the combination of grooved saddles and bearers with the corrugated beams constituting said double arch and with suitable tie-bolts and rods to support, stay, and strengthen the same;

The object of my invention being to obtain with the least weight of metal the strongest possible support for bridges, roofs, floors, and similar structures spanning wide, open intervals.

In the accompanying drawing—

Figure 1 represents a perspective view of a bridge constructed on my improved plan.

Figure 2, a cross-section through the blocks or saddles C C C parallel with and immediately in front of the bolts I I I, illustrating the same enlarged.

Figure 3, a cross-section through the arches of the bridge passing through the blocks or saddles C′ C′ C′ parallel with and immediately in front of the bolts E E E.

Figure 4 is a cross-section through one of the corrugated beams of the structure illustrating the form of the corrugations.

Figure 5, a perspective view of one of the sockets or bearers F detached and enlarged.

The bridge as shown in the drawing represents a single span between two abutments, J J, and consists of three parallel double arches, each formed by the combination of two metallic arched beams, B M, curved upon arcs of different radii, placed one upon the other, the curve of the upper beam M being greater than that of the lower one B.

The peculiar corrugation of these beams is clearly shown in figs. 2, 3, and 4, and is such as that their ends will fit into each other and interfold when brought together.

The ends of each of the double arches B M rest on bearers or socket-plates F, secured in the abutments J J, and projecting slightly above the same.

These bearers or socket-plates F are corrugated or deeply grooved on their upper side, (see fig. 5,) so as to form the counterpart of the under side of the beams of the arches to fit therein, and give lateral support to their folds, thereby preventing a widening or spreading thereof.

Similar blocks or saddles C grooved to fit over and upon the upper side of said corrugated beams, are also provided and placed upon the upper beams of the arches, as shown in figs. 1, 2, and 3, at each end of the arches, and at intermediate points along their length.

The ends of the arches are secured and the beams in each united by means of transverse bolts I, which pass through the saddle-blocks C, the ends of the arches B M, and the socket-plates F, into the abutments J J.

The intermediate blocks C′, grooved and formed like the blocks C, are placed at equal distances apart upon the upper curve of the double arches, and corresponding bottom plates or bearers G G, grooved like the socket-plates or bearers F to fit upon the under side of the beams, are placed under the lower beams of the double arches beneath each block C′.

Suspension-bolts E are inserted through the blocks C′, and through the flanges of both beams B and M of the arches, and the bottom plates G, to firmly tie the double arches, the bolt-heads H being below the bottom-plates G, all as represented in figs. 1 and 3.

The double arches B M are thus united in such a way that their relative position is unchangeable, and so that they form a superstructure of great strength.

The series of arches represented in the drawing are connected by corrugated cross-beams L L, which rest with their ends upon the flanges of the lower beams M of the double arches B M, immediately over the intermediate bottom-plates G, so that the bolts E shall pass and engage their ends, as will be seen in figs. 1 and 3.

These cross-beams may be used to support the flooring of the bridge; while, at the same time, they tend to steady and hold the different arches together.

I prefer to make the arched or curved portion of each corrugated beam thicker than its sides so that the greatest strength is obtained with a given weight of metal.

In forming the single arches B or M to be combined in pairs so as to form double arches B M, as described, two or more beams may be united longitudinally to form a continuous curved arch of the required length, where the required span is too great for the length of a single beam.

I claim as my invention—

1. The within-described double arch, formed, substantially as herein set forth, of arches B M, of longitudinally-corrugated metal describing curves of different radius.

2. Bearers or socket-plates F or G, grooved to fit the under side of the corrugated curved beams B M, in combination with blocks or saddles C or C′, grooved to fit upon the upper side of said beams, when said bearers and blocks are placed in pairs, upon opposite sides of the superimposed beams B M, and are connected and secured by transverse tie-bolts I or E, substantially in the manner and for the purpose herein set forth.

Witnesses: R. MONTGOMERY.

DAVID A. BURR,
H. H. YOUNG.